United States Patent
Boyd et al.

(10) Patent No.: US 9,624,996 B2
(45) Date of Patent: Apr. 18, 2017

(54) ROBUST BUMPER SPRING ASSEMBLY

(71) Applicant: Flowco Production Solutions, LLC, Spring, TX (US)

(72) Inventors: Mitchell A. Boyd, Haslet, TX (US); Garrett S. Boyd, Godley, TX (US)

(73) Assignee: Flowco Production Solutions, LLC, Spring, TX (US)

( * ) Notice: Subject to any disclaimer, the term of this patent is extended or adjusted under 35 U.S.C. 154(b) by 0 days.

(21) Appl. No.: 14/996,828

(22) Filed: Jan. 15, 2016

(65) Prior Publication Data

US 2016/0208830 A1 Jul. 21, 2016

Related U.S. Application Data

(60) Provisional application No. 62/103,921, filed on Jan. 15, 2015.

(51) Int. Cl.
| | |
|---|---|
| *F16F 1/12* | (2006.01) |
| *F16F 1/04* | (2006.01) |
| *E21B 43/12* | (2006.01) |
| *B23B 47/00* | (2006.01) |

(52) U.S. Cl.
CPC ............. *F16F 1/04* (2013.01); *E21B 43/121* (2013.01); *B23B 47/00* (2013.01); *F16F 1/12* (2013.01)

(58) Field of Classification Search
CPC .... F16F 1/04; F16F 1/12; F04B 47/12; B23B 47/00
USPC .............. 267/286, 136, 137, 166, 170, 174; 188/371, 372; 173/37, 54
See application file for complete search history.

(56) References Cited

U.S. PATENT DOCUMENTS

| | | | | |
|---|---|---|---|---|
| 2,437,429 A | * | 3/1948 | Hossfeld | E21B 1/02 173/37 |
| 4,571,162 A | | 2/1986 | Knox | |
| 4,932,471 A | * | 6/1990 | Tucker | E21B 23/10 166/113 |
| 6,669,449 B2 | | 12/2003 | Giacomino | |
| 8,286,700 B1 | * | 10/2012 | Franchini | E21B 17/07 166/156 |
| 8,464,798 B2 | | 6/2013 | Nadkrynechny | |
| 8,863,837 B2 | | 10/2014 | Bender et al. | |
| 9,068,443 B2 | | 6/2015 | Jefferies et al. | |
| 2014/0116714 A1 | | 5/2014 | Jefferies et al. | |
| 2014/0230940 A1 | | 8/2014 | Patton | |

OTHER PUBLICATIONS

Lufkin, Plunger Lift; Bumper Springs website, 2 pages, © 2013 Lufkin Industries, LLC www.lufkin.com.
Weatherford, Plunger Lift Systems brochure, 4 pages; © 2005 Weatherford www.weatherford.com.

* cited by examiner

*Primary Examiner* — Thomas J Williams
(74) *Attorney, Agent, or Firm* — Whitaker Chalk Swindle & Schwartz PLLC; Stephen S. Mosher (57) ABSTRACT

A bumper spring assembly having a one piece mandrel including an integral head piece is further configured with a cage assembly retained on the mandrel with a cage nut locked to the mandrel to obviate the need for pins, set screws, and the like, to provide a more robust assembly. In two embodiments the cage nut is locked to the mandrel in a swaging operation. Improved flow of fluids through and around the bumper spring assembly are also provided.

20 Claims, 7 Drawing Sheets

ROBUST BUMPER SPRING ASSEMBLY

CROSS REFERENCE TO RELATED APPLICATIONS

The present application claims priority to U.S. Provisional Patent Application Ser. No. 62/103,921 filed Jan. 15, 2015 by the same inventors and entitled ROBUST BUMPER SPRING ASSEMBLY.

BACKGROUND OF THE INVENTION

1. Field of the Invention

The present invention generally relates to tools for use in oil and gas well operations, and more particularly to improved bumper spring tools for use in oil and gas wells.

2. Background of the Invention and Description of the Prior Art

A newly drilled and completed well typically has enough pressure within the formation to cause liquids in the formation and the well to flow to the surface without aid. Over time, however, as the well's production volume and bottom-hole pressure decline the liquids fall back on the perforations—the passages into the formation—thus creating what is called a "loaded well" condition. In this condition the well no longer has sufficient pressure to cause the liquids to flow to the surface without some artificial lift.

A plunger lift is a type of artificial lifting device utilized in oil and gas wells to efficiently unload liquids. The system usually requires no external energy to provide the necessary pressure to lift the liquids to the surface, instead relying on the residual pressure in the well to lift the plunger. The gas-to-liquid ration required varies depending on many conditions. The common rule of thumb used in the industry is 300 to 400 scf per barrel per 1000' of depth.

Figure 1:
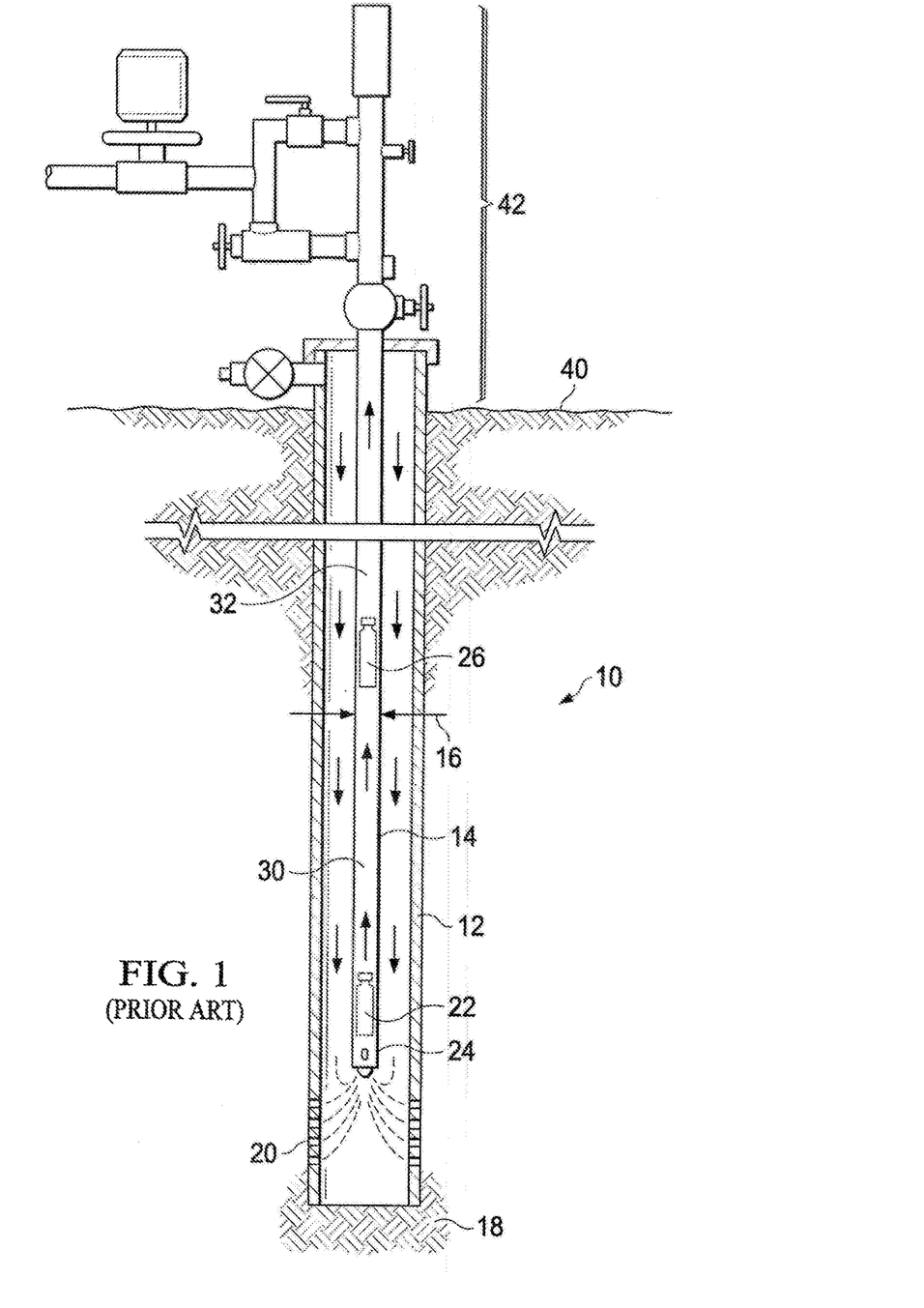
FIG. 1 illustrates a typical oil and gas well fitted with a prior art plunger lift and bumper spring devices.

FIG. 1 illustrates a conventional oil and gas well fitted with a plunger lift system for controlling production, including generic plunger lift and bumper spring devices typical of the prior art. The system illustrated in FIG. 1 typically comprises the following structures. A well 10 is formed by a casing 12 that lines the well 10. Within the casing 12 is a tubing string 14 that encloses the well bore 16 through which oil or gas 30 is produced from a formation 18 through perforations 20. Within the well bore 16 is a bumper spring assembly 22 resting on a seating nipple 24 (which may also be called a tubing or collar stop). A lift or bypass plunger 26, shown traveling upward under the pressure of the fluids and/or gas in the well bore 16, pushes or lifts a "slug" of fluid 32 ahead of it. The well 10 includes the wellhead apparatus 42 disposed on the surface of the earth 40 for directing the production of the well to appropriate receptacles or pipelines (not shown).

A bumper spring assembly is a tool that is typically placed in a seating nipple at the lower end of the tubing in the well to absorb the momentum of the bypass or lift plunger as it reaches the seating nipple, thereby protecting the seating nipple from damage. Structurally, most bumper springs comprise a shaft or mandrel, a head piece at the upper end and a cage attached to the lower end. The head piece and cage are typically threaded onto the mandrel and secured with a pin to prevent the rotation of the end piece with respect to the mandrel so that the bumper spring becomes disassembled. Other methods to prevent loosening of the end pieces include welding and lock nuts.

Conventional plungers do not readily fall through flow within the well, so the well must be closed to stop the flow so that the plunger will fall to the bottom of the well due to gravity, contacting the bumper spring at the bottom. The fall speed of such plungers (which include pad, brush, solid, sand, spiral, etc.) typically ranges from 50 to 400 feet/minute. Newer types of plungers (such as bypass, continuous run, flow-through, ball & sleeve, sliding sleeve, etc.) are designed for falling through flowing liquids to enable substantially high production from the well. This performance is provided by features such as passages or ports machined into the body of the plunger or its cage to permit liquid flow. However, the rate of fall of these plungers may reach velocities as high as 2000 feet/minute. The greater momentum of such plungers places much greater stress on the pinned components of the bumper spring. This is a serious disadvantage because the pins are frequently sheared, resulting in loosening of the components of the bumper spring. The head piece or cage may become unscrewed, allowing loose pieces to travel up and down the well depending on the flow of the well. Damage to the plunger, the well casing or other structures may result; in other cases the plunger may become stuck in the well bore, lodged there by pieces that become wedged between the plunger and the well bore. This causes the well to be shut down while the problem is repaired, causing a substantial loss of production.

Conventional bumper spring assemblies may also impede the flow of production because of their position within the well bore, often in the path of fluids entering the well bore from the perforated regions of the well casing.

Accordingly there is a need for an improved bumper spring assembly that survives many high-velocity cycles in the well bore and presents minimal obstruction to the flow of production facilitated by the bypass or lift plunger used to restore production.

SUMMARY OF THE INVENTION

Accordingly in a first embodiment of the present invention a bumper spring assembly is provided comprising a one piece mandrel having a head end and a tail end, an integral head piece at its head end, and a concentric bore formed in the tail end that further includes an external thread surrounding the tail end; a bumper spring configured as a coil spring disposed concentrically on the mandrel, a first end thereof adjacent the head end; a bumper spring cage disposed concentrically on the mandrel adjacent a second opposite end of the bumper spring; and a cage nut, having an internal screw thread terminated by an outward-directed chamfer near the distal end of the cage nut, threaded onto the external screw thread of the tail end of the mandrel thereby securing the bumper spring and the bumper spring cage between the head end of the mandrel and the cage nut; wherein further a distal portion of the tail end of the mandrel is expanded outward in a cold forming process against the threads in the cage nut next to the outward chamfer to lock the threads of the cage nut to the tail end of the mandrel without the use of pins or set screws.

In another aspect of the first embodiment, the outward expansion of the distal portion of the tail end of the mandrel deforms the endmost screw threads of the cage nut and the tail end of the mandrel proximate the outward-directed chamfer.

In another aspect, the headpiece comprises a solid cylindrical member configured with a fishing hook at a first end and a stabilizing body at a second end wherein the stabilizing body includes longitudinal stabilizing ridges, concentric flow reliefs, and chamferred edges.

In another aspect, the longitudinal stabilizing ridges comprise a plurality of longitudinal strips of the outermost diameter of the stabilizing body alternately disposed between the longitudinal undercuts.

In another aspect, the concentric flow reliefs comprise a plurality of longitudinal undercuts in the outermost diameter of the stabilizing body, alternately disposed with the longitudinal stabilizing ridges around the circumference of the stabilizing body.

In another aspect, the longitudinal undercuts are of substantially equal dimensions and may be either flat or curved in a concave direction.

In another aspect, the bumper spring comprises a coil spring formed of wire having a uniform pitch that may include closed and ground ends.

In another aspect the bumper spring cage is a hollow cylindrical member that may include one or more of flow ports, relieved channels, and egress sweeps, wherein the flow ports may include at least two elongated openings through the walls of the hollow cylindrical member that are separated by substantially equal intervals around the circumference of the bumper spring cage.

In a second embodiment of the present invention a mandrel for a bumper spring assembly is disclosed comprising a one piece mandrel having a head end and a tail end, an integral head piece disposed at its head end, and a concentric bore formed in the tail end that further includes an external thread surrounding the tail end; and a cage nut having an internal screw thread is threaded onto the external screw thread of the tail end of the mandrel for securing a bumper spring and a bumper spring cage between the head end of the mandrel and the cage nut; wherein further a distal portion of the tail end of the mandrel is swaged during a cold forming, process to lock the cage nut to the tail end of the mandrel without the use of pins or set screws.

In another aspect, the swaged distal portion of the tail end of the mandrel is flared against the cage nut.

In another aspect, the integral headpiece comprises a solid cylindrical body having first and second ends and a fishing neck disposed at the first end thereof; a stabilizing body disposed at the second end of the headpiece and having a plurality of stabilizer ridges disposed around a full diameter thereof; wherein the stabilizing body includes a plurality of undercut reliefs disposed in alternating relationship with the stabilizer ridges around the circumference of the headpiece and parallel to a longitudinal axis of the headpiece; and a taper or chamfer around edges of the stabilizing body proximate the second end of the head piece.

In another aspect, a bumper spring cage for use with the mandrel of the second embodiment comprises a hollow cylindrical member having a plurality of elongated flow ports formed between an inside bore and an outer surface of the hollow cylindrical member; wherein the elongated flow ports are uniformly disposed around the circumference of the hollow cylindrical member.

In another aspect, the bumper spring cage comprises a plurality of exit channels connecting the elongated flow ports with the outer diameter of the cage; wherein the exit channels are fluted with a plurality of longitudinal grooves along the length thereof.

In another aspect, a bumper spring for use with the second embodiment comprises a coil spring disposed concentrically on the mandrel, wherein the coil spring is formed of wire having a uniform pitch, and may include closed and ground ends thereof.

DETAILED DESCRIPTION OF THE INVENTION

In an advance in the state of the art, a bumper spring assembly is configured with features to provide a substantially more robust design that is resistant to being damaged by forces encountered during use. For example, the method of locking the headpiece to the mandrel or locking the cage nut to the mandrel using pins or set screws are much more susceptible to being sheared as the mandrel recoils after being struck by a rapidly descending or ascending plunger. It is one of the principle features and advantages of the present invention that the use of such pins or screws is eliminated, thereby eliminating the risk of the pins or screws becoming sheared in the presence of repeated recoil events when the bumper spring assembly is subject to a rapidly descending or ascending plunger. Other features of the bumper spring assembly are included to improve the flow of fluids through and around the bumper spring. The following description makes reference to various aspects of the attached drawings.

Introduction

Figure 2:
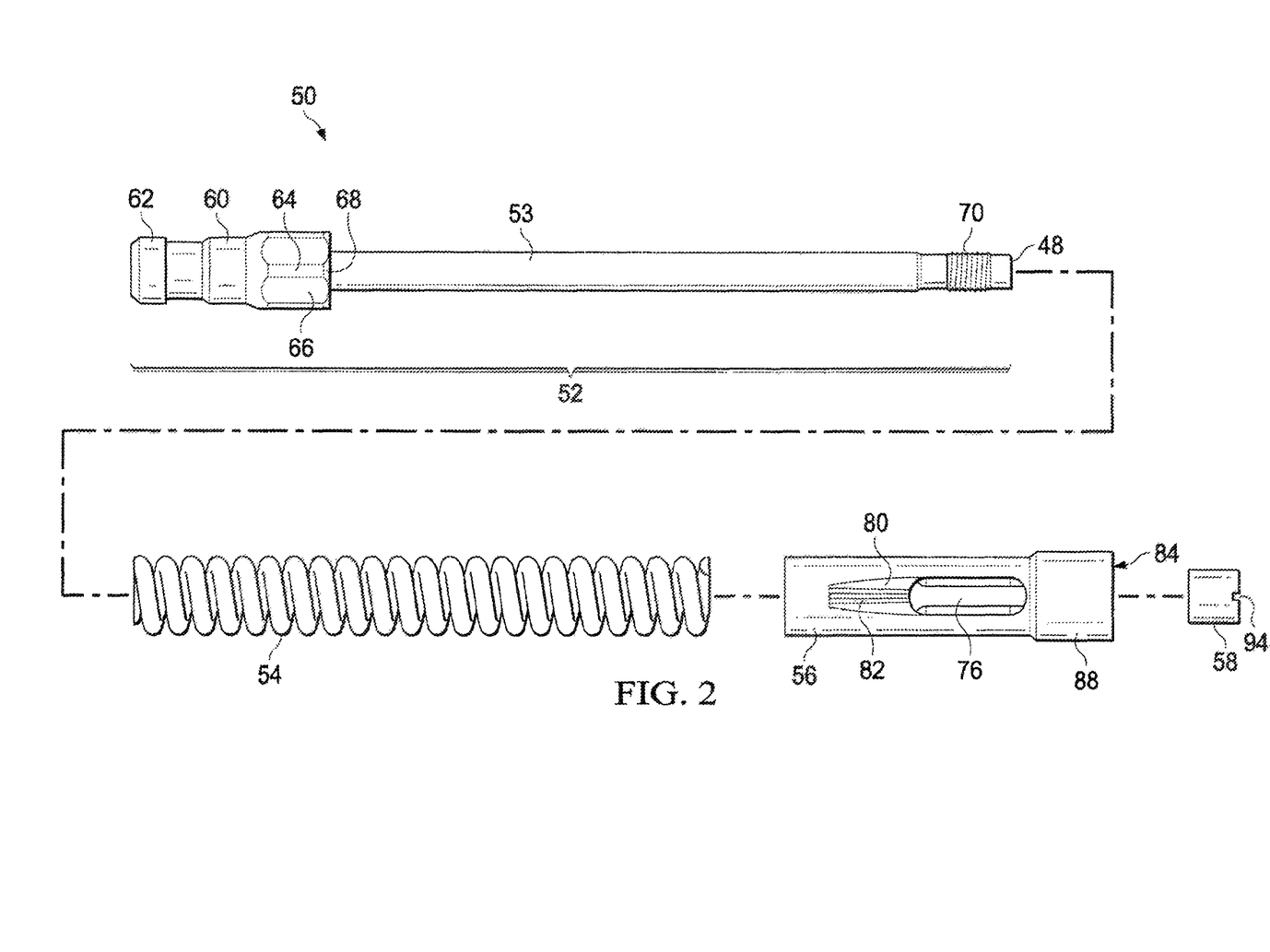
FIG. 2 illustrates an exploded view of a bumper spring according to one embodiment of the present invention.

The robust bumper spring assembly of the present invention includes four components, each with one or more distinct features that contribute to the improved durability and performance of the assembly. Referring to FIG. 2 the four components are (1) a solid, one-piece mandrel/main shaft with integral head piece and fishing neck at an upper or head end thereof; (2) a coil spring disposed on the main shaft portion of the mandrel; (3) a cage disposed over the lower or tail end of the mandrel to retain the coil spring on the main shaft; and (4) an end nut (or cage nut) that threads onto the threaded tail end of the main shaft. The tail end of the mandrel is swaged to the installed end nut to permanently and securely retain the cage on the mandrel, thereby securing the four components together into a single unit that is highly resistant to deconstruction by conditions of use.

As will be described, each of these four structures has specific design features that together produce a more robust bumper spring tool capable of superior performance and durability. Further, it will be apparent that the present invention is capable of wide application to virtually all types of bumper springs having a variety of features, each intended for a specific purpose. However, bumper springs of all types may advantageously utilize the novel combinations of features described and claimed herein. Accordingly, the disclosures herein apply to any bumper spring device that includes the combinations recited in the appended claims, regardless of whether a particular bumper spring includes or does not include other features in addition to the claimed combinations.

The solid, one-piece mandrel of the novel bumper spring includes two sections, a head piece and a main shaft, which are formed as a single structure that is referred to as the mandrel. Reference to either the head piece or the main shaft is understood as reference to that section of the mandrel. The upper or head end of the one-piece mandrel disclosed herein includes the integral head piece that includes a fishing neck and features to enhance stability of the bumper spring device and flow of fluids moving past it, At its lower or tail end, just below the lower end of the coil spring (when uncompressed) the OD of the main shaft portion of the mandrel is slightly reduced, forming a narrow external shoulder "X" on the main shaft. The reduced portion includes external threads over a portion of its length to receive the internal threads of an end nut. The tail end of the main shaft, called a forming end in some contexts hereinafter, is bored to an ID slightly less than its reduced OD to receive a swaging tool die for locking the end nut onto the main shaft.

The cage is a hollow cylindrical component that has an internal bore through its length. The internal diameter (ID) of the upper portion of the cage that slides over the OD of the main shaft is slightly larger than the OD of the main shaft by a nominal clearance value to enable it to move freely over the main shaft of the mandrel when the bumper spring is absorbing the impact of a bypass plunger, for example. Below the upper portion of the cage, its ID expands to receive the end nut when it is threaded onto the main shaft. The junction of the enlarged ID of the cage and the nominal ID of the cage forms an internal shoulder "Y" within the cage. The end nut, when installed, forms a fixed stop nut that bears against this internal shoulder "Y" to retain the cage against or near the coil spring. The cage is free to slide for a limited distance along the main shaft as the coil spring is compressed while absorbing the momentum of a falling plunger against the upper or "head" end of the mandrel portion of the bumper spring assembly. When thus absorbing the momentum of a plunger the lower portion of the mandrel/main shaft moves downward though the cage against the tension in the coil spring, and recoils upward as the coil spring returns toward its uncompressed state as the end nut contacts the internal shoulder "Y" of the cage.

The present invention combines several novel features to improve the durability of the bumper spring assembly during its use in the bottom of a well and to reduce its restriction to the flow of fluids past the bumper spring as it descends toward its installed position or during production of the fluids from the formation served by the well.

The durability of the bumper spring is improved by (a) the use of a swaging operation to lock the end nut and the mandrel together. Further, (b) enlarging the OD of the headpiece portion of the mandrel slightly above the OD of the coil spring increases the stability of the bumper spring assembly in the well bore, thus reducing the wear of the headpiece and increasing the longevity of the assembly. The flow of fluids through and past the bumper spring assembly is improved by (c) machining shallow reliefs (flat or scalloped; if scalloped, having a slightly curved or concave cross section) along the outer surface of the head around its diameter; (d) chamfering the lower OD of the headpiece inward to taper its profile, thus reducing the turbulence of fluids around the head of the mandrel; and (e) providing elongated passages or channels formed from inside the cage outward and upward through the wall of the cage enabling fluids to flow through the cage from below and into the well bore. These passages may preferably be further relieved at the outlet to smooth the flow path. Further, the surfaces of the relieved passages may preferably be formed with several narrow, closely-spaced cylindrical grooves or "egress sweeps" oriented parallel with each other to reduce turbulence and improve flow of the fluids through the relieved passages. All of these flow-enhancing features reduce drag and have been found to improve the flow of fluids from the formation up to 20% or more.

Regarding feature (a) in the preceding paragraph, the improvement to the durability of the bumper spring by the use of a swaging operation to lock the end nut to the main shaft, there are two embodiments. In a first embodiment, the length of the main shaft portion of the mandrel extends slightly past the lower end of the end nut when it is threaded onto the main shaft, and the protruding end of the main shaft is swaged in a machine operation—i.e., expanded or flared outward—to lock the end nut to the main shaft. In the flared version, the wall thickness of the bored end of the main shaft must be thin enough to permit the metal to properly flare over the end nut to lock it in place.

Figure 11:
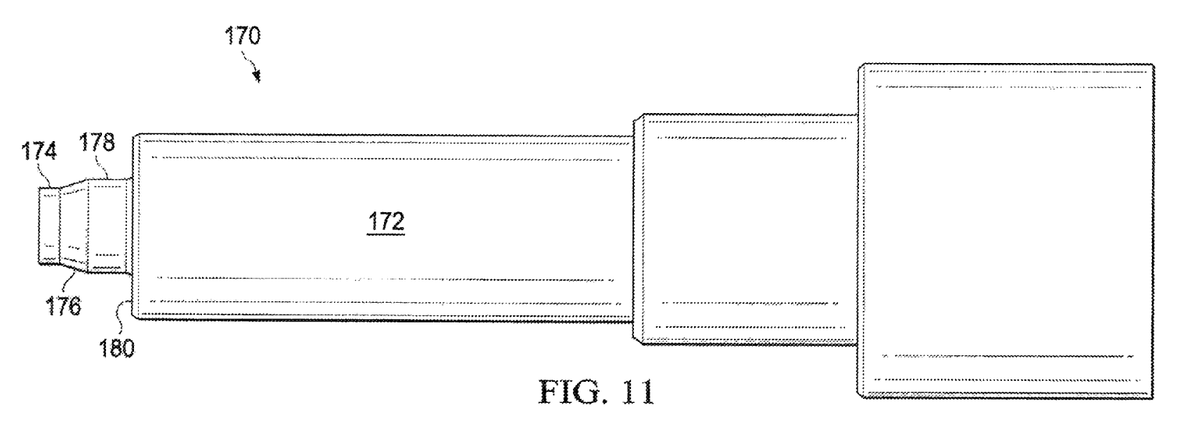
FIG. 11 illustrates a side view of a swaging tool for cold forming the embodiment depicted in FIG. 10.

In a second, preferred embodiment, the main shaft portion of the mandrel is altered so that the end nut butts against the narrow "X" shoulder on the main shaft of the mandrel when the end nut is threaded thereon. Further, the lower end of the end nut is shortened so that it does not extend past the lower end of the main shaft when it is fully threaded on to the main shaft to butt against the narrow "X" shoulder. In addition, the ID of the end of the main shaft is reduced relative to the OD to thicken its wall and reduce the likelihood of cracks. Then, during the swaging operation, instead of flaring the end of the main shaft outward over the end nut, the end of the main shaft is expanded just enough during the cold forming swaging operation to bear outward against the internal threads of the end nut to lock the end nut into position on the main shaft between the narrow shoulder "X" and the swaged end of the main shaft. The effect of this swaging operation is to increase the ID of the main shaft's end slightly outward (due to the tapered shape of the cold forming die inserted into the ID of the main shaft as shown in FIG. 11). This preferred embodiment, because it locks the end nut at both of its ends, more reliably secures the end nut to the main shaft so that the assembly is much less likely to become loosened during use.

DETAILED DESCRIPTION

FIG. 2 illustrates an exploded view of an improved bumper spring according to one embodiment of the present invention. Bumper spring assembly 50 includes a one-piece mandrel 52 (including a main shaft 53) shown in the upper half of the drawing and having an integral headpiece 60, a coil spring 54, and a cage 56 to be installed over the end of the mandrel 52 opposite the headpiece 60 and secured with a cage (or end) nut 58. In the descriptions to follow, a portion of the mandrel 52 (and its main shaft 53) appear in detail views of the cage 56 in FIGS. 6 and 7. Similarly, a portion of the mandrel 132 (and its main shaft 133) appear in detail views of the cage 136 in FIGS. 9 and 10. The headpiece 60 includes a fishing neck 62, a plurality of longitudinal stabilizing ridges 64 disposed around the outside diameter of the headpiece 60, a plurality of concentric flow reliefs 66, and a streamline taper (or external chamfer) 68. The headpiece 60 is a compound structure configured with several features to provide lateral stability to the bumper spring 50 in the bottom of the well or as it descends en route thereto. The stabilizing ridges 64 are configured as a plurality of longitudinal strips of the OD of the headpiece 60 separated by the concentric flow reliefs 66 disposed at equal radial intervals around the circumference of the body of the headpiece 60. The concentric flow reliefs 66 may preferably include a plurality of longitudinal undercuts in the outermost diameter of the headpiece 60, alternately disposed with the longitudinal stabilizing ridges 64 around the circumference of the headpiece 60. The undercuts may be flat or curved in a concave manner, thereby forming trough-like passages for the flow of fluids that move past the bumper spring 50 during use.

The mandrel 52 shown in FIG. 2 includes a tail end 48 and a threaded portion 70 on the OD of the tail end 48. In this description the tail end 48 is also called a forming end 48, referring to its function during a swaging operation to assemble the bumper spring. The bumper spring 54 is preferably a coil spring formed of spring steel wire and having a uniform coil pitch and closed and ground ends as shown in FIG. 2, As new materials are developed for spring applications, other materials having equivalent characteristics may be suitable. Although no damping element to absorb recoil of the bumper spring is shown in the drawings, some embodiments of the bumper spring device disclosed herein may advantageously employ a recoil damping mechanism for certain applications.

Continuing with FIG. 2, the cage 56 includes egress or flow ports 76—usually at least two disposed around the body of the cage 56—having a relieved channel 80 that includes a series of egress sweeps 82, which are narrow, substantially parallel grooves formed to enhance the flow of fluid through and away from the interior of the cage 56. The cage includes an internal bore 84 for receiving the mandrel 52 and its tail end 48 therein after the coil spring 54 is assembled on to the mandrel 52. An end nut 58 includes internal threads (not shown in this view) that enable it to be threaded onto the threads 70 of the tail end 48 to secure the cage 56 on the mandrel 52. A pair of wrench flats 88 and a tightening slot 94 are formed respectively in the cage 56 and the end nut 58 to facilitate the use of hand tools in tightening the end nut 58 onto the mandrel 52. Further details of the configuration of the mandrel 52, headpiece 60, spring 54, cage 56 and cage or end nut 58 are described in other figures.

Figure 3:
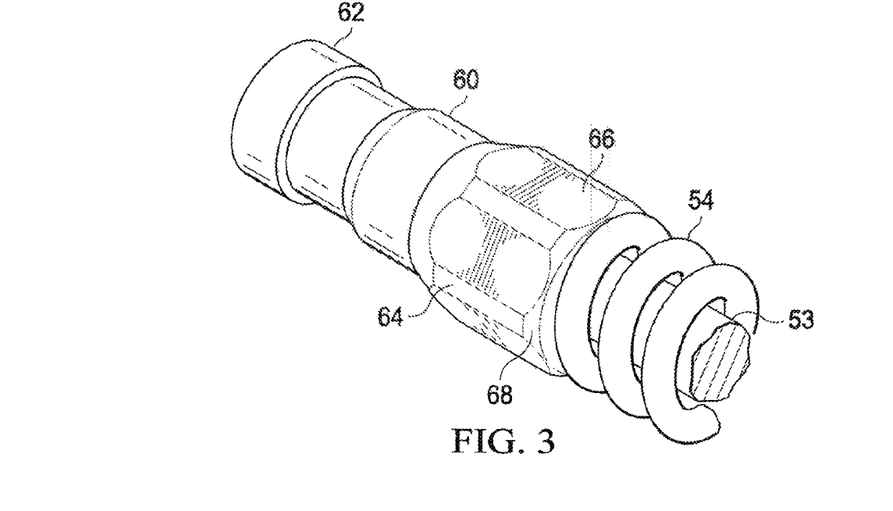
FIG. 3 illustrates a detail view of the head end of the embodiment of FIG. 2.

FIG. 3 illustrates a detail view of the head piece 60 disposed at the end of the embodiment of the one-piece mandrel 52 of FIG. 2, shown assembled with a portion of the coil spring 54. The mandrel 52 is, for example, preferably machined from a single bar of alloy steel or stainless steel stock such that the headpiece 60 is formed as an integral part of the mandrel 52. The head piece 60 includes a fishing neck 62 formed at the end. At the opposite end of the headpiece 60 the body of the head piece 60 includes longitudinal portions—stabilizing ridges 64—of the outer diameter surface of the head piece 60 separated by a plurality of undercut flow reliefs 66 disposed around the circumference of the head piece 60. This portion of the head piece forms a stabilizer. In a preferred embodiment, six of the flow reliefs 66 (either flat or concavely curved), preferably of equal width, are separated by equal-width longitudinal stabilizing ridges 64 in the outer diameter of the head piece 60. The number and spacing of the flow reliefs 66 may be varied to suit a particular application. As mentioned previously, the profile of the reliefs 66 may be flat ("flats" 66) or curved to form troughs ("troughs" 66). To reduce damage to the coil spring 54 and the mandrel 52, the outer diameter of the head piece 60, which is coincident with the surfaces of the stabilizing ridges, is sized to be slightly larger than the outer diameter of the coil spring 54 to provide stability within the well tubing by reducing the amount of side-to-side deflection during descent of the bumper spring 50. At the lower end of the head piece adjacent to the spring 54, the edge 68 of the head piece is chamfered. Together with the flow relief flats 66, the chamfered edge 68 enhances the flow of fluids past the bumper spring by reducing drag as the bumper spring descends.

The one-piece or unitary head piece portion of the bumper spring illustrated in FIG. 3 provides superior strength and durability of the headpiece/mandrel combination as compared with a separate headpiece that is attached to the end of the mandrel with respective internal and external threads and then secured with pins or set screws passed through the two separate parts. The traditional method of locking the headpiece to the mandrel using pins or set screws is much more susceptible to being sheared as the mandrel recoils after being struck by a rapidly descending or ascending plunger. It is one of the principle features and advantages of the present invention that the use of such pins and screws is avoided, thereby eliminating the risk of the pins or screws becoming sheared in the presence of repeated recoil events when the bumper spring assembly is subject to a rapidly descending plunger.

Figure 4:
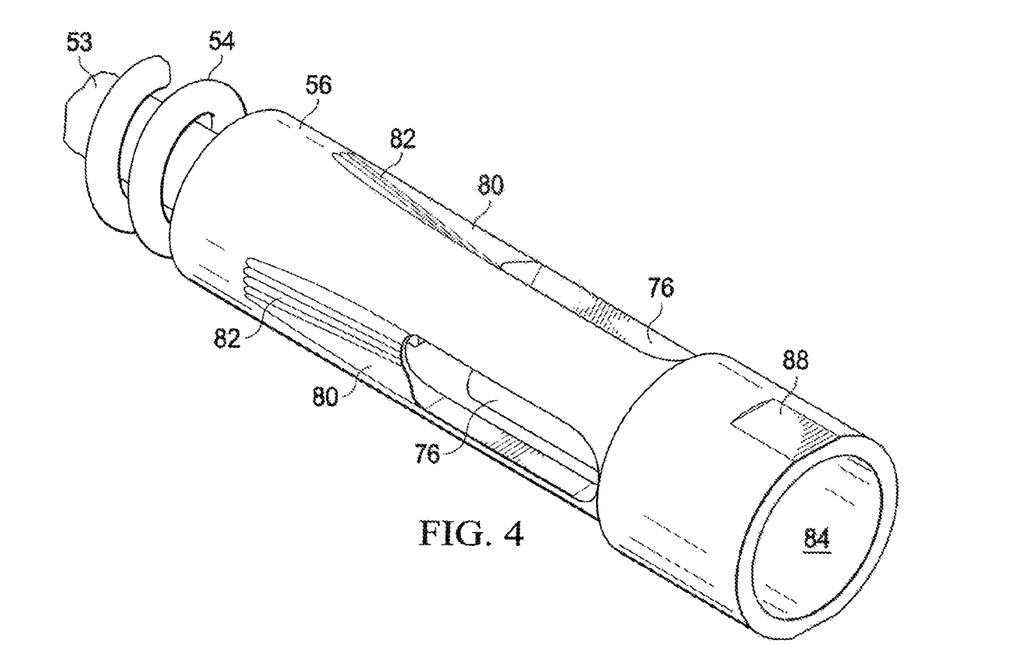
FIG. 4 illustrates a detail view of the cage end of the embodiment of FIG. 2.

FIG. 4 illustrates a detailed view of a portion of the cage 56 of the embodiment of FIG. 2 to depict the flow ports 76 disposed around the body of the cage 56. The cage 56, being hollow to receive the mandrel 52 includes the flow ports 76—openings between the inside and outside of the cage—to provide a path for the flow of fluids through the bumper spring assembly 50 when it is disposed at the bottom of a well or while it is descending through the well bore tubing. The flow ports 76 are usually disposed at equal intervals around the body of the cage 56, and include a relieved channel 80 for each flow port 76 that includes a series of egress sweeps 82, which are narrow, substantially parallel grooves formed in each relieved channel 80 to enhance the flow of fluid through and away from the interior of the cage 56.

Figure 5A:
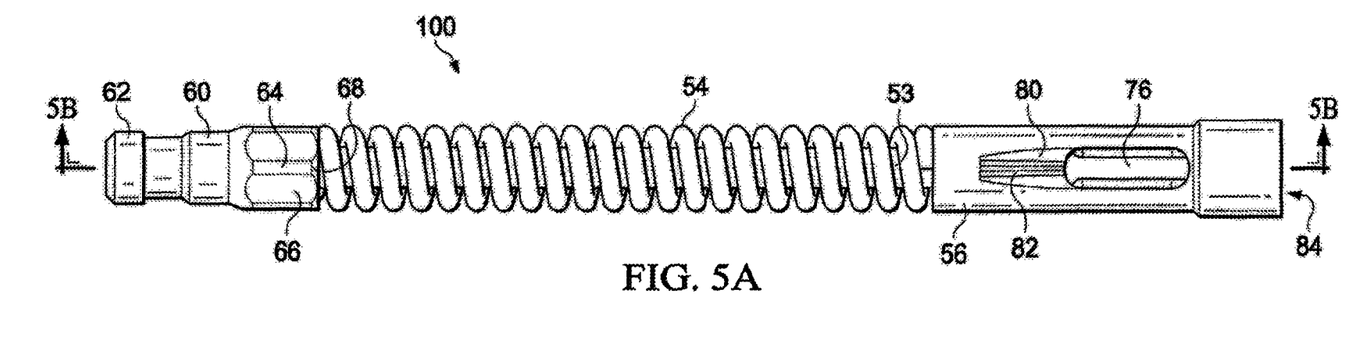
FIG. 5A illustrates an assembled side view of the bumper spring embodiment of FIG. 2.
Figure 5B:
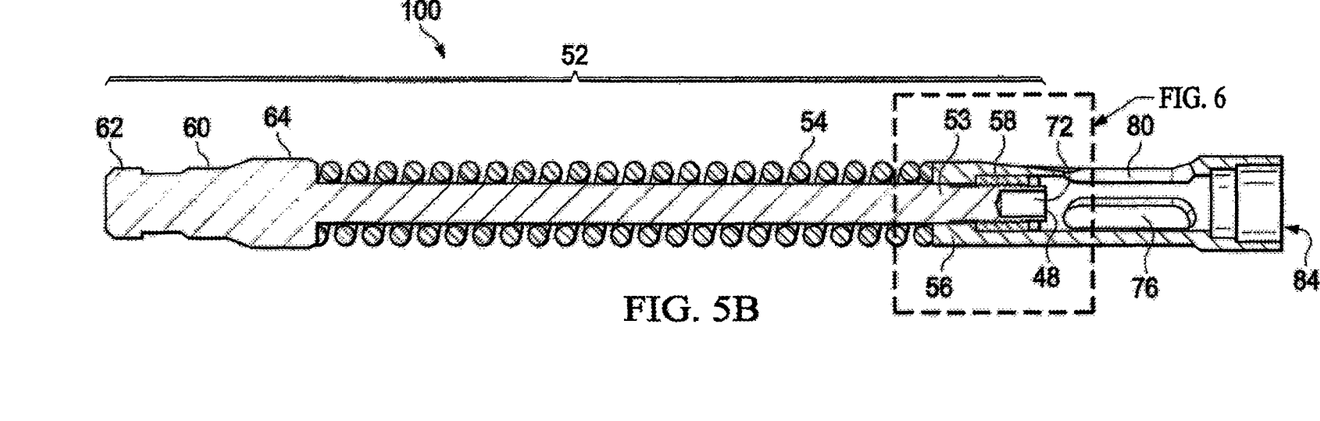
FIG. 5B illustrates a cross section view of the assembled bumper spring of FIG. 5A.

FIGS. 5A and 5B depict assembled versions of the embodiment of FIGS. 2 and 3 to show the relationship of the various components. FIG. 5A illustrates a side view of the assembled bumper spring 100 of the embodiment of FIGS. 2 and 3, while FIG. 5B illustrates a cross section view of the assembled bumper spring 100 of FIG. 5A to show the internal relationships of the components described for FIGS. 2, 3 and 4. All of the components of FIGS. 5A and 5B are identified with the same reference numbers as previously.

Figure 6:
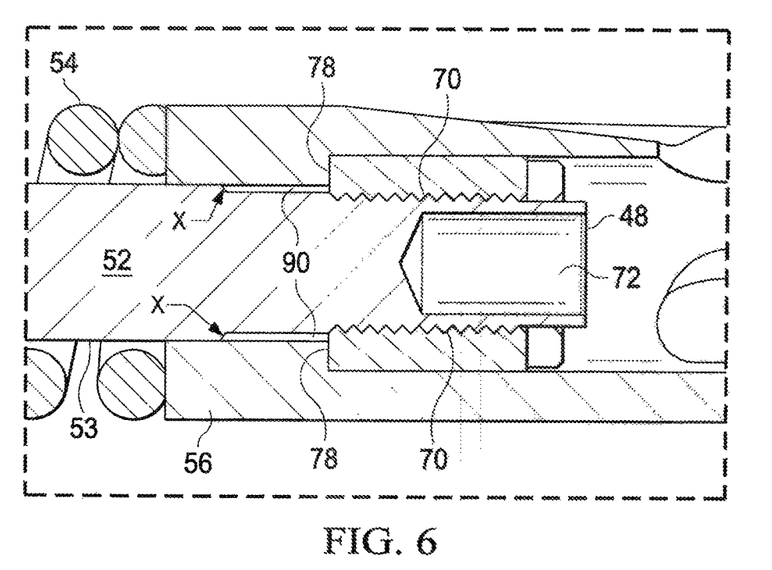
FIG. 6 illustrates a cross section view of the cage end of one embodiment of the present invention prior to a swaging operation.
Figure 7:
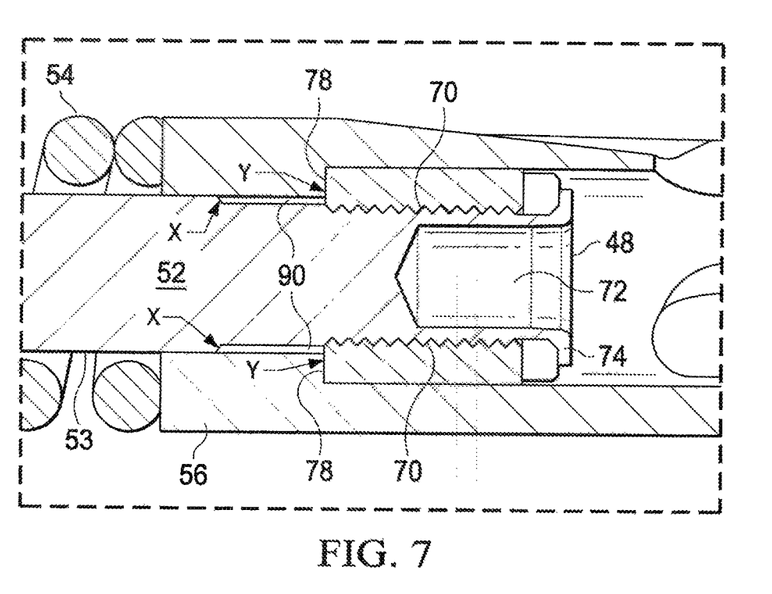
FIG. 7 illustrates a cross section view of the cage end of the embodiment of FIG. 6 after the swaging operation.

FIG. 6 shows a cross section view of the lower end of the bumper spring assembly 100 of FIG. 5B prior to a swaging or cold-forming operation performed with a swaging tool (to be described) under very high pressure. FIG. 7 depicts the configuration of the bumper spring assembly 100 after the swaging operation. Shown in FIG. 6 is a bore 72 formed in the tail end 48 of the mandrel 52. The bore 72 is concentric with the longitudinal centerline of the mandrel 52, Also shown in FIG. 6 is a shoulder 78 (the "Y" shoulder described previously) formed inside the cage 56. The shoulder 78 is provided for the end nut 58 to bear against when the end nut 58 is fully threaded onto the mandrel 52, to position the cage 56 against the lower end of the spring 54. The spring 54 is thus confined between the cage 56 and the integral head piece 60 (see FIGS. 5A and 5B). Reference number 70 indicates the locus of the threaded joint between the tail end of the mandrel 48 and the end nut 58. The end nut 58 retains the cage 56 on the mandrel 52.

FIG. 7 depicts, in cross section, the same assembly as FIG. 6 except that the tail end 48 of the mandrel 52 has been swaged, by cold forming using a special die, to flare the tail end 48 outward against the end of the mandrel 52, thereby producing the flared end 74. This configuration provides a positive locking of the cage nut 58 onto the threaded end of the mandrel 52, thereby creating a unitary structure that is more durable, i.e., resistant to loosening or disassembly, than the use of pins or set screws to lock these two components together. As is well known, pins and set crews are susceptible to being sheared as the mandrel recoils after being struck by a rapidly descending plunger.

Figure 8:
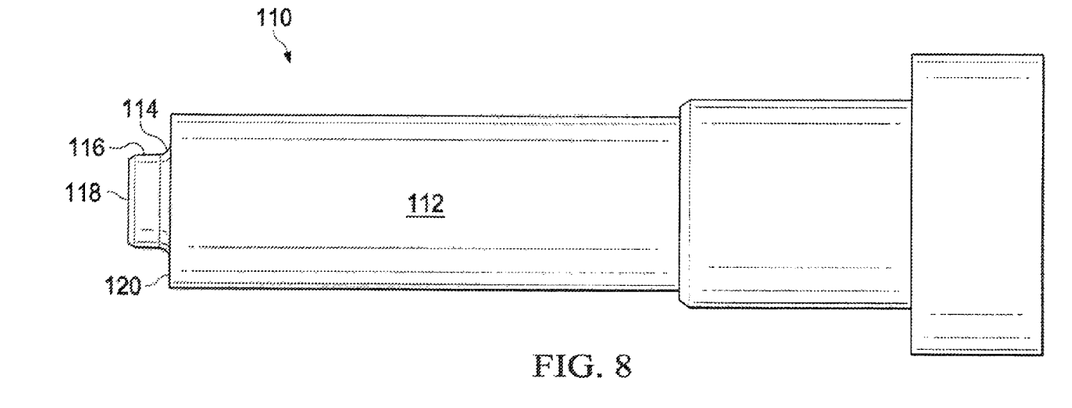
FIG. 8 illustrates a side view of a swaging tool for cold forming the embodiment depicted in FIG. 7.

FIG. 8 illustrates a side view of a swaging tool 110 (or die 110) for use in cold forming the tail end 48 (as shown in FIG. 7) when assembling the bumper spring 54, bumper spring cage 56, and cage or end nut 58 to the mandrel 52 according to the embodiment of FIGS. 2 and 5. The swaging tool or die 110 is machined at the end (to the left in the figure) to form the flared end 74 of the bore 72 in the end of the mandrel 52. The details of the specific configuration of the swaging tool 110 and its body 112 include a fillet radius 114, a swaging taper 116, a lead-in angle 118, and a flanging face 120. The die 110 is thus shaped to flare the end of the mandrel 52 so that it can firmly and securely trap the cage nut 58 on the mandrel 52 smoothly and without cracking the metal of the mandrel 52.

To perform the swaging operation the swaging tool 110 is installed in a press (not shown) having a capacity of at least 14 tons. The machined end (114 etc.) of the swaging tool 110 is inserted into the bore 72 of the forming or tail end 48 of the mandrel 52 after the bumper spring 54, bumper spring cage 56 and cage nut 58 are installed on the mandrel 52. Under sufficient pressure exerted by the press, the steel material at the forming end 48 of the mandrel 52 flows outward in the cold forming process to form the flared end 74 of the mandrel 52 against the cage nut 58 as shown in FIG. 7.

Figure 9:
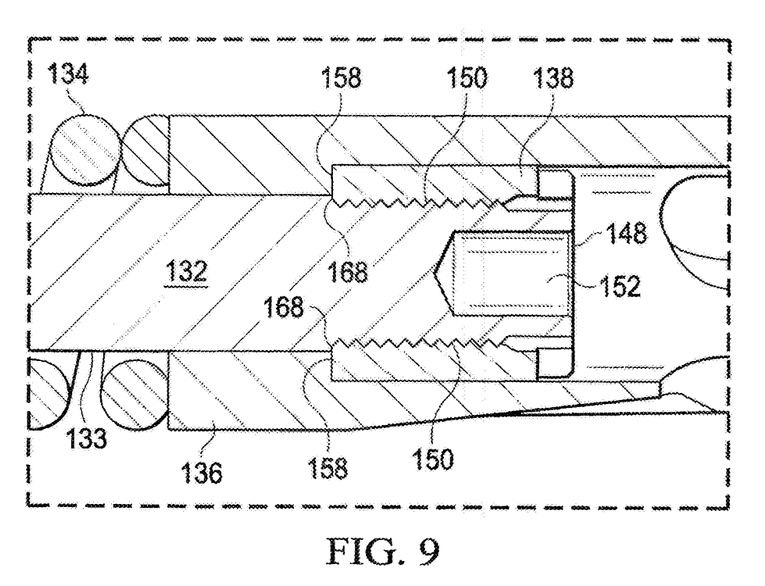
FIG. 9 illustrates a cross section view of the cage end of a second embodiment of the present invention prior to a swaging operation.
Figure 10:
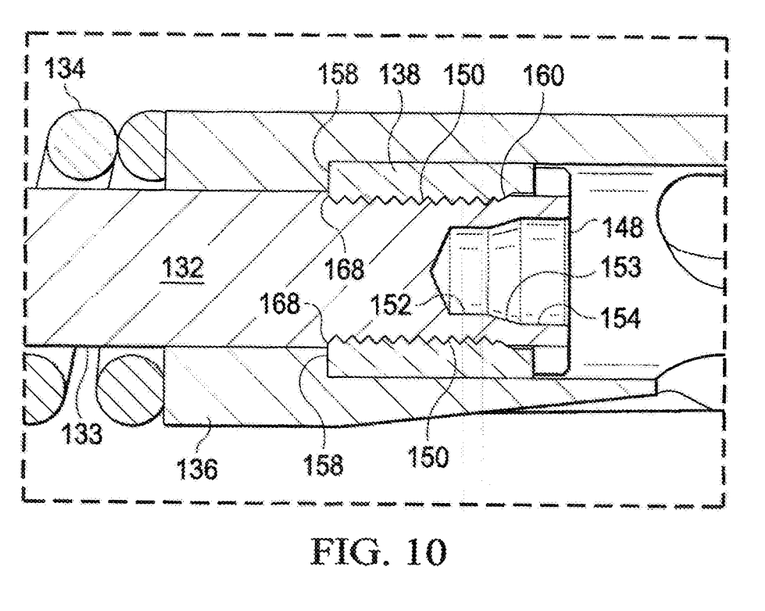
FIG. 10 illustrates a cross section view of the cage end of the embodiment of FIG. 9 after the swaging operation.

FIGS. 9, 10, and 11 illustrate cross section and side views of an alternative (or "second") embodiment to the embodiment depicted in FIGS. 6, 7, and 8 that as been found to be even more effective in securing the components of the bumper spring 50 from loosening. The embodiment shown in FIGS. 9 and 10 is similar to the embodiment depicted in FIGS. 2 through 7 except for the structure of the joint that secures the end nut to the mandrel.

FIG. 9 shows a cross section view of the lower end of a second embodiment of the bumper spring assembly 100 of FIGS. 5A and 5B prior to the swaging or cold-forming operation performed with the swaging tool 170 (to be described) of FIG. 11 under very high pressure. FIG. 10 depicts the configuration of the second embodiment of the bumper spring assembly 100 after the swaging operation. Shown in FIG. 9 is a bore 152 formed in the tail end 148 of the mandrel 132. The bore 152 is concentric with the longitudinal centerline of the mandrel 132. The spring 134 is shown surrounding the mandrel 132. Also shown in FIG. 9 is a cage shoulder 158 (the shoulder "Y" described previously) formed inside the cage 136. The cage shoulder 158 is provided for the end nut 138 to bear against when the end nut 138 is fully threaded onto the mandrel 132, to position the cage 136 against the lower end of the spring 134. The spring 134 is thus confined between the cage 136 and the integral head piece 60 (see FIGS. 5A and 5B).

Continuing with FIG. 9, in the second embodiment shown in FIG. 9 the forming end 148 of the mandrel 132 is configured slightly differently than the mandrel 52 depicted in FIG. 6. This difference is that the mandrel shoulder "X" as shown in FIG. 6 is extended to the position 168 shown in FIG. 9, eliminating the clearance gap 90 (See FIG. 6) so that the end nut 138 butts against both the cage nut shoulder 158 and the mandrel shoulder 168 when the end nut 138 is fully threaded onto the mandrel 132. Reference number 150 indicates the locus of the external thread surrounding the outer diameter of the bored out portion 152 of the tail end 148 of the mandrel 132 and the internal threads of the end nut 138 that is installed on the tail end 148 of the mandrel 132. The end nut 138 is used to secure the cage 136 onto the mandrel 132. The end nut 138 is formed with a nominal ID that is threaded to match the threads on the tail end 148 of the mandrel 132 and a 45 degree conical expansion of the nominal ID from the 45 degree conical expansion to a larger ID to the end of the end nut 138, as shown in FIG. 9.

FIG. 10 depicts, in cross section, the same assembly as FIG. 9 (i.e., of the second embodiment of the bumper spring assembly 100 of FIG. 5B) except that the forming end 148 of the mandrel 132 has been swaged, by cold forming using the special die 170 shown in FIG. 11, to expand the distal portion of the tail end 148 outward against the inside wall of the cage or end nut 138. As thus expanded, the outer surface of the mandrel 132 at the end 160 of the threaded portions of the end nut 138 and mandrel 132 deforms the threads 150 to prevent them from loosening, This configuration provides a positive locking of the end nut 138 onto the threaded end of the mandrel 132, thereby creating a unitary structure that is more durable, i.e., resistant to loosening or disassembly, than the use of pins or set screws to lock these two components together. As is well known, pins and set crews are susceptible to being sheared as the mandrel recoils after being struck by a rapidly descending plunger.

FIG. 11 illustrates a side view of a swaging tool 170 (or die 170) for cold forming the tail end 148 of the second embodiment depicted in FIGS. 9 and 10 when assembling the bumper spring 134, bumper spring cage 136, and cage or end nut 138 to the mandrel 132 according to the embodiment of FIGS. 2 and 5. The swaging tool or die 170 is machined at the end (to the left in the figure) to form the expanded end 154 of the bore 152 in the end of the mandrel 132. The details of the specific configuration of the swaging tool 170 and its body 172 include sections of the tool 170 for forming respectively the guide diameter 174 (for aligning the tool with the bore 152), the swage/lead-in angle 176 (for forming the transition zone 153), the swaging diameter 178 (for expanding the forming end 148 of the mandrel 132 to the expanded end 154), and the stop face 180 (for controlling the penetration depth of the swaging tool 170).

To perform the swaging operation the swaging tool 170 is installed in a press (not shown) having a capacity of at least 14 tons. The machined end (174 etc.) of the swaging tool 170 is inserted into the bore 152 of the forming end 148 of the mandrel 132 after the bumper spring 134, bumper spring cage 136 and cage nut 138 are installed on the mandrel 132. Under sufficient pressure exerted by the press, the steel material at the forming end 148 of the mandrel 132 flows outward to form the expanded end 154 of the mandrel 132 against the cage nut 138 as shown in FIG. 10. The die is shaped and the press is operated so that the die does not bottom out or become stuck in the bore 152.

While the invention has been shown and described in only one of its forms, it is not thus limited but is susceptible to various changes and modifications without departing from the spirit thereof. For example, it is well known that bumper springs are available in numerous configurations, designed for use in a variety of conditions and applications in the down-hole well environment. As such, a bumper spring device may have a variety of features, each intended for a specific purpose. However, bumper springs of all types may have a number of features or characteristics in common, including the novel combinations of features described and claimed herein. Accordingly, the disclosures provided herein apply to any bumper spring device that includes the combinations of features recited in the following claims, regardless of whether a particular bumper spring includes or does not include other features in addition to the claimed combinations. Examples of such other features may include but are not limited to seating cups or seals, latch down devices, tubing stops or collars, no-go devices or features of seating or landing nipples, and the like.

What is claimed is:

1. A bumper spring assembly, comprising:
   a one piece mandrel having a head end and a tail end, an integral head piece at its head end, and a concentric bore formed in the tail end that further includes an external thread surrounding the tail end;
   a bumper spring configured as a coil spring disposed concentrically on the mandrel, a first end thereof adjacent the head end;
   a bumper spring cage disposed concentrically on the mandrel adjacent a second opposite end of the bumper spring; and
   a cage nut, having an internal screw thread terminated by an outward-directed chamfer near the distal end of the cage nut, threaded onto the external screw thread of the tail end of the mandrel thereby securing the bumper spring and the bumper spring cage between the head end of the mandrel and the cage nut; wherein further
   a distal portion of the tail end of the mandrel is expanded outward in a cold forming process against the threads in the cage nut next to the outward chamfer to lock the threads of the cage nut to the tail end of the mandrel without the use of pins or set screws.

2. The assembly of claim 1, wherein the outward expansion of the distal portion of the tail end of the mandrel deforms the endmost screw threads of the cage nut and the tail end of the mandrel proximate the outward-directed chamfer.

3. The assembly of Claim 1, wherein the headpiece comprises a solid cylindrical member configured with a fishing neck at a first end and a stabilizing body at a second end wherein the stabilizing body includes longitudinal stabilizing ridges, concentric flow reliefs, and chamferred edges.

4. The assembly of claim 3, wherein the longitudinal stabilizing ridges comprise a plurality of longitudinal strips of the outermost diameter of the stabilizing body alternately disposed between the longitudinal undercuts.

5. The assembly of claim 3, wherein the concentric flow reliefs comprise a plurality of longitudinal undercuts in the outermost diameter of the stabilizing body, alternately disposed with the longitudinal stabilizing ridges around the circumference of the stabilizing body.

6. The assembly of claim 5, wherein the longitudinal undercuts are of substantially equal dimensions.

7. The assembly of claim 5, wherein the longitudinal undercuts are flat.

8. The assembly of claim 5, wherein the longitudinal undercuts are curved in a concave direction.

9. The assembly of claim 3, wherein the chamferred edges comprise inward-rounded edges of the outermost diameter of the stabilizing body proximate the first end of the bumper spring.

10. The assembly of claim 1, wherein the bumper spring comprises a coil spring formed of wire and having a uniform pitch.

11. The assembly of claim 10, wherein the bumper spring comprises a coil spring formed with closed and ground ends.

12. The assembly of claim 1, wherein the bumper spring cage is a hollow cylindrical member comprising one or more of the following features selected from the group consisting of flow ports, relieved channels, and egress sweeps.

13. The assembly of claim 12, wherein the flow ports comprise at least two elongated openings through a wall of the hollow cylindrical member and separated by substantially equal intervals around the circumference of the bumper spring cage.

14. A mandrel for a bumper spring assembly, comprising:
   a one piece mandrel having a head end and a tail end, an integral head piece disposed at its head end, and a concentric bore formed in the tail end that further includes an external thread surrounding the tail end; and
   a cage nut having an internal screw thread is threaded onto the external screw thread of the tail end of the mandrel for securing a bumper spring and a bumper spring cage between the head end of the mandrel and the cage nut; wherein further
   a distal portion of the tail end of the mandrel is swaged during a cold forming process to lock the cage nut to the tail end of the mandrel without the use of pins or set screws.

15. The mandrel of claim 14, wherein the swaged distal portion of the tail end of the mandrel is flared against the cage nut.

16. The mandrel of claim 14, wherein the integral headpiece comprises:
   a solid cylindrical body having first and second ends and a fishing neck disposed at the first end thereof;
   a stabilizing body disposed at the second end of the headpiece and having a plurality of stabilizer ridges disposed around a full diameter thereof; wherein
   the stabilizing body includes a plurality of undercut reliefs disposed in alternating relationship with the stabilizer ridges around the circumference of the headpiece and parallel to a longitudinal axis of the headpiece; and
   a taper or chamfer around edges of the stabilizing body proximate the second end of the head piece.

17. A bumper spring cage for use with the mandrel of claim 14, comprising:
   a hollow cylindrical member having a plurality of elongated flow ports formed between an inside bore and an outer surface of the hollow cylindrical member; wherein
   the elongated flow ports are uniformly disposed around the circumference of the hollow cylindrical member.

18. The bumper spring cage of claim 17, wherein further comprising:
   a plurality of exit channels connecting the elongated flow ports with the outer diameter of the cage; wherein
   the exit channels are fluted with a plurality of longitudinal grooves along the length thereof.

19. A bumper spring for use with the mandrel of claim 14, comprising a coil spring disposed concentrically on the mandrel, a first end of the coil spring adjacent the headpiece.

20. The bumper spring of claim 19, wherein the coil spring comprises a wire, having a uniform pitch, and having closed and ground ends thereof.

\* \* \* \* \*